US 8,016,199 B2

(12) United States Patent
Nunnink

(10) Patent No.: US 8,016,199 B2
(45) Date of Patent: Sep. 13, 2011

(54) ILLUMINATION DEVICES FOR IMAGE ACQUISITION SYSTEMS

(75) Inventor: Laurens Nunnink, Simpelveld (NL)

(73) Assignee: Cognex Corporation, Natick, MA (US)

( * ) Notice: Subject to any disclaimer, the term of this patent is extended or adjusted under 35 U.S.C. 154(b) by 634 days.

(21) Appl. No.: 11/639,402

(22) Filed: Dec. 14, 2006

(65) Prior Publication Data

US 2008/0142604 A1 Jun. 19, 2008

(51) Int. Cl.
*G06K 7/10* (2006.01)

(52) U.S. Cl. .......... 235/462.42; 235/462.01; 235/462.35

(58) Field of Classification Search .................. 235/454, 235/455, 462.01, 462.06, 462.24, 462.31, 235/462.35, 462.41, 462.42, 473
See application file for complete search history.

(56) References Cited

U.S. PATENT DOCUMENTS

| 3,317,722 | A | * | 5/1967 | Whitney ...................... 313/512 |
|---|---|---|---|---|
| 3,344,269 | A | * | 9/1967 | Brown ............................. 362/84 |
| 4,266,164 | A | * | 5/1981 | Schroeder ................. 315/169.1 |
| 4,697,075 | A | | 9/1987 | Roos et al. |
| 4,725,761 | A | * | 2/1988 | Schroeder et al. ......... 315/169.3 |
| 5,041,326 | A | * | 8/1991 | Schroeder et al. ............. 428/161 |
| 5,325,276 | A | * | 6/1994 | Sullivan .......................... 362/84 |
| 5,461,417 | A | * | 10/1995 | White et al. .................. 348/131 |
| 5,585,616 | A | * | 12/1996 | Roxby et al. ............. 235/462.06 |
| 6,229,265 | B1 | * | 5/2001 | Schroeder-Perry et al. .......................... 315/169.3 |
| 6,275,742 | B1 | | 8/2001 | Sagues et al. |
| 6,454,437 | B1 | * | 9/2002 | Kelly ............................ 362/246 |
| 6,598,797 | B2 | * | 7/2003 | Lee .......................... 235/462.22 |
| 6,601,768 | B2 | * | 8/2003 | McCall et al. ............ 235/462.42 |
| 6,661,521 | B1 | * | 12/2003 | Stern ............................. 356/446 |
| 6,854,650 | B2 | * | 2/2005 | Hattersley et al. ............ 235/454 |
| 6,929,375 | B2 | * | 8/2005 | Satomi ............................ 362/11 |
| 6,933,172 | B2 | | 8/2005 | Tomimatsu |
| 7,017,817 | B2 | * | 3/2006 | Ito et al. .................... 235/462.42 |
| 7,048,400 | B2 | | 5/2006 | Murasko et al. |
| 7,639,861 | B2 | | 12/2009 | Michael et al. |
| 2003/0160100 | A1 | * | 8/2003 | Ito et al. ................... 235/462.42 |
| 2004/0179209 | A1 | * | 9/2004 | Besch ........................... 356/614 |
| 2005/0087601 | A1 | * | 4/2005 | Gerst et al. ..................... 235/455 |
| 2005/0195318 | A1 | * | 9/2005 | Komatsu et al. .............. 348/370 |
| 2006/0032921 | A1 | * | 2/2006 | Gerst et al. .................... 235/455 |
| 2006/0131419 | A1 | * | 6/2006 | Nunnink .................. 235/472.02 |
| 2006/0133757 | A1 | * | 6/2006 | Nunnink ....................... 385/133 |
| 2007/0091332 | A1 | | 4/2007 | Nunnink |

* cited by examiner

*Primary Examiner* — Daniel A Hess
*Assistant Examiner* — Paultep Savusdiphol

(57) ABSTRACT

An apparatus for imaging a symbol associated with an object which includes a housing and an imaging module connected to the housing, where the imaging module includes at least one lens for creating an image of the symbol. The imaging module further has a sensor for sensing the image. An electroluminescent light sheet is connected to the housing, and the electroluminescent light sheet provides at least one of dark field illumination and bright field illumination.

31 Claims, 7 Drawing Sheets

ILLUMINATION DEVICES FOR IMAGE ACQUISITION SYSTEMS

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates to illumination devices for image acquisition systems, and more particularly, to illumination devices for image acquisition systems used for reading identification codes.

BACKGROUND OF THE INVENTION

Machine vision sensors and identification (ID) readers are used for reading printed and direct part mark (DPM) codes for manufacturers implementing part traceability programs in the automotive, aerospace, electronics, healthcare, defense, and other industries and for other applications such as quality control during production of a product, supply chain processes and end use applications. Exemplary ID codes include 1-D barcodes and 2-D codes Code 128, Code 39, UPC, EAN, interleaved 2 of 5, and QR Code. The rapid adoption of DPM codes and other identification for part traceability has manufacturers demanding a rugged, self-contained reader that performs consistently on all types of codes and parts. In order for an optical detection system such as an ID or symbology reader to reliably read everything from the most challenging DPM codes to relatively simple printed barcodes, proper illumination of the object on which the ID code is marked or printed is required.

In the case of identification symbol detection using an image sensor or camera, the type of symbology detected affects illumination requirements. For example, a UPC barcode can be printed on a label or packaging and can present a relatively high contrast and corresponding readability to an optical ID reader, typically having black bars on a white background. Where barcodes and other viewed subjects are printed on a flat surface with contrasting ink or paint, a diffuse, high-angle "bright field" illumination may best highlight these features for the sensor. By high-angle it is meant, generally, that light strikes the object on which a mark is applied nearly perpendicularly (normal) or at an angle that is typically no less than about 45 degrees from perpendicular (normal) to the surface of the item being scanned. Such illumination is subject to substantial reflection back toward the sensor. By way of example, barcodes that require mainly bright field illumination may be present on a printed label adhered to an item or container, or on a printed field in a relatively smooth area of item or container.

In contrast, an advancing and growing field for smart cameras or imaging systems is direct part mark (DPM) identification where, as the label implies, marks are directly applied to parts (e.g. via etching, dot peening, etc.). An exemplary widely used DPM code is the well known Data Matrix code.

When a symbol or mark is etched or peened onto a surface of a part or a component and the surface of the part or component is rough or irregular, high-angle bright field illumination may not be appropriate. To this end, irregular surfaces of mark features tend to scatter as much light back to the reader as the surface to which the mark is applied, resulting in indistinguishable features in the image.

Low angle, "dark field" illumination has been shown to be suitable for certain direct part marking applications. Dark field illumination includes low-angle illumination that strikes a marked surface at a low angle (e.g., at an angle between 45 degrees and 90 degrees from an axis perpendicular to the surface). Using such low angle dark field illumination, two-dimensional surface texture is contrasted more effectively (with indents appearing as bright spots and the surroundings as shadow) for improved image detection and recognition. Further, certain reading applications may yield higher successful read rates when a combination of bright field and dark field illumination is used.

ID readers are known which provide dark field illumination by illuminating a light pipe with light emitting diodes (LEDs) where an angled surface at the end of the light pipe reflects the LED light to provide low-angle illumination of a marked surface. Bright field illumination has been provided by other sets of LEDs and diffusers. The light from the bright field LEDs are incident on a reflector which is directed toward the object, and the reflected light then passes through a diffuser before it is incident on the object.

Known ID reader lighting assemblies have several shortcomings. First, intensity differences between LEDs have been known to create non-uniformities in the illumination. Second, known systems require multiple LED sets and/or additional optics, such as light pipes, reflectors and diffusers. Third, in the case of the bright field illumination, the diffuser absorbs some of the light, thereby reducing the brightness of the light applied to the marked surface. Fourth, in the case of the bright field illumination, the LEDs are off the optical axis of the reflector, which can also create non-uniformities in the illumination.

SUMMARY OF THE INVENTION

The invention comprises, in one form thereof, an apparatus for imaging a symbol associated with an object which includes a housing, and an imaging module connected to the housing, where the imaging module includes at least one lens for creating an image of the symbol. The imaging module further has a sensor for sensing the image. An electroluminescent light sheet is connected to the housing, and the electroluminescent light sheet provides at least one of a dark field illumination and a bright field illumination.

The invention comprises, in another form thereof, an apparatus for detecting and recognizing at least one characteristic of an object, which includes a housing, and a detection module connected to the housing. The detection module includes an imaging element for directing a reflected light from the object, wherein the reflected light includes information inherent in the at least one characteristic. An electroluminescent light sheet is connected to the housing and provides an incident light for illuminating the at least one characteristic.

The invention comprises, in yet another form thereof, a method of illuminating and detecting a symbol which is on an object, comprising the steps of: providing an apparatus for imaging the symbol which is on the object as has been described above; and illuminating the symbol on the object with at least one of the dark field illumination and the bright field illumination.

The invention comprises, in yet another form thereof, an apparatus for detecting and recognizing at least one characteristic of an object which includes a housing, and a detection module supported by the housing. The detection module includes an imaging element for directing a reflected light from the object wherein the reflected light includes information inherent in the at least one characteristic. An extended diffuse illumination source is supported by the housing and generates an incident light for illuminating the at least one characteristic.

An advantage of the present invention is that it provides optical detection systems, such as ID or symbology readers, which have more uniform bright field illumination and/or dark field illumination.

Another advantage of the present invention is that it provides a diffuse (uniform, non-directed, cloudy day) type illumination which can advantageously be use to read dark marks, on highly polished surfaces such as laser or chemically etched, or inkjet codes on polished cylindrical rods, sheets of metal, or semiconductor wafers, and other markings and characteristics.

Yet another advantage of the present invention is that it provides optical detection systems, such as ID or symbology readers, which have fewer optical components.

Yet another advantage of the present invention is that it provides a more cost effective design for optical detection systems.

Yet another advantage of the present invention is that it can provide selective color illumination.

Yet another advantage of the present invention is that it can easily be adapted to either handheld or fixed mount readers.

Yet another advantage is that the presently inventive electroluminescent light sheet does not require a diffuser for bright field illumination, which diffuser absorbs light, and therefore the present invention has better illumination efficiency.

Yet another advantage is that the electroluminescent light sheet according to the present invention can be smaller than known bright and dark field illumination systems.

Yet another advantage of the present invention is that it can eliminate the need for an illumination circuit board.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE PREFERRED EMBODIMENT

Figure 1:
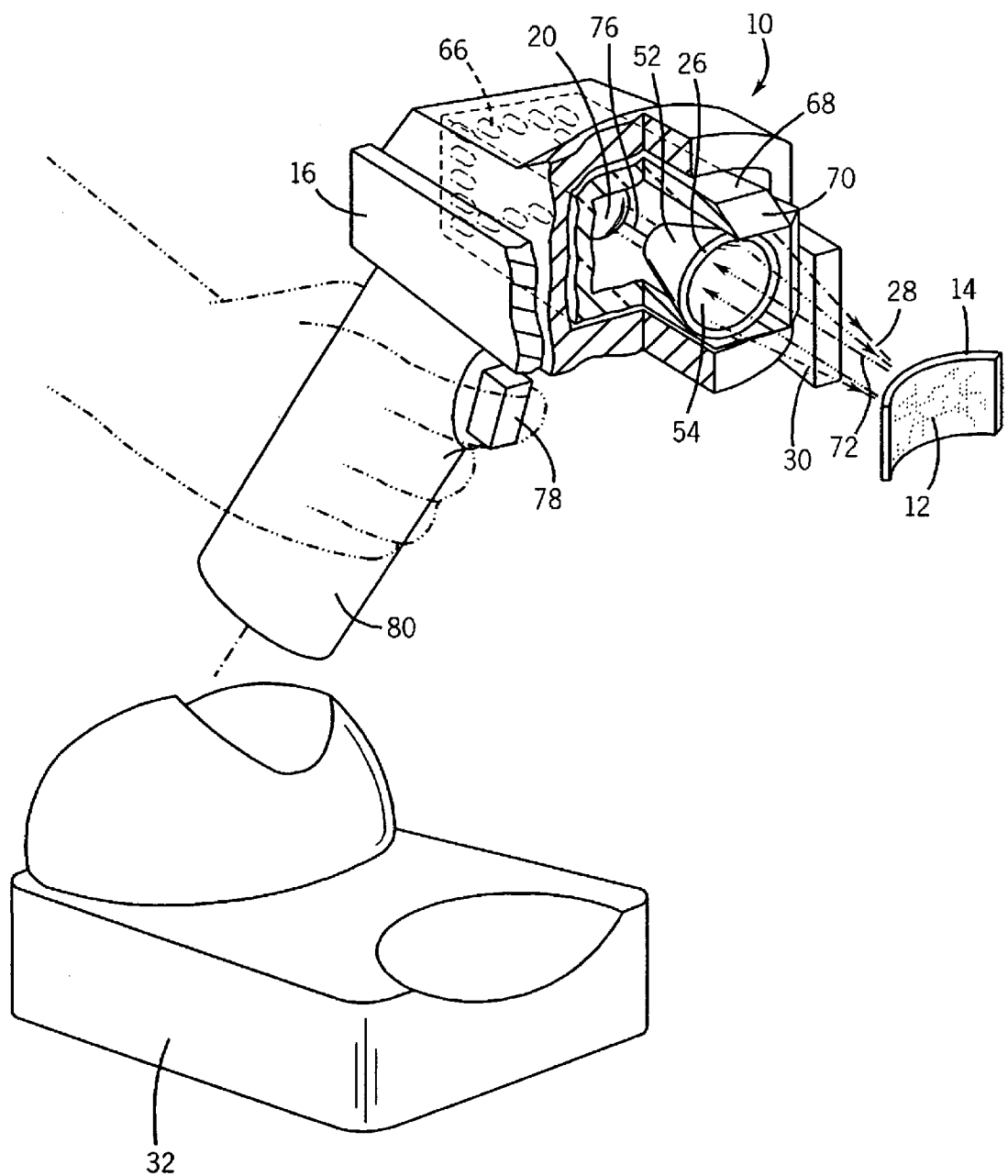
FIG. 1 is a fragmentary perspective view of an embodiment of an optical detection system, particularly in the form of a symbology or ID reader, and including a frustoconical electroluminescent light sheet.
Figure 2:
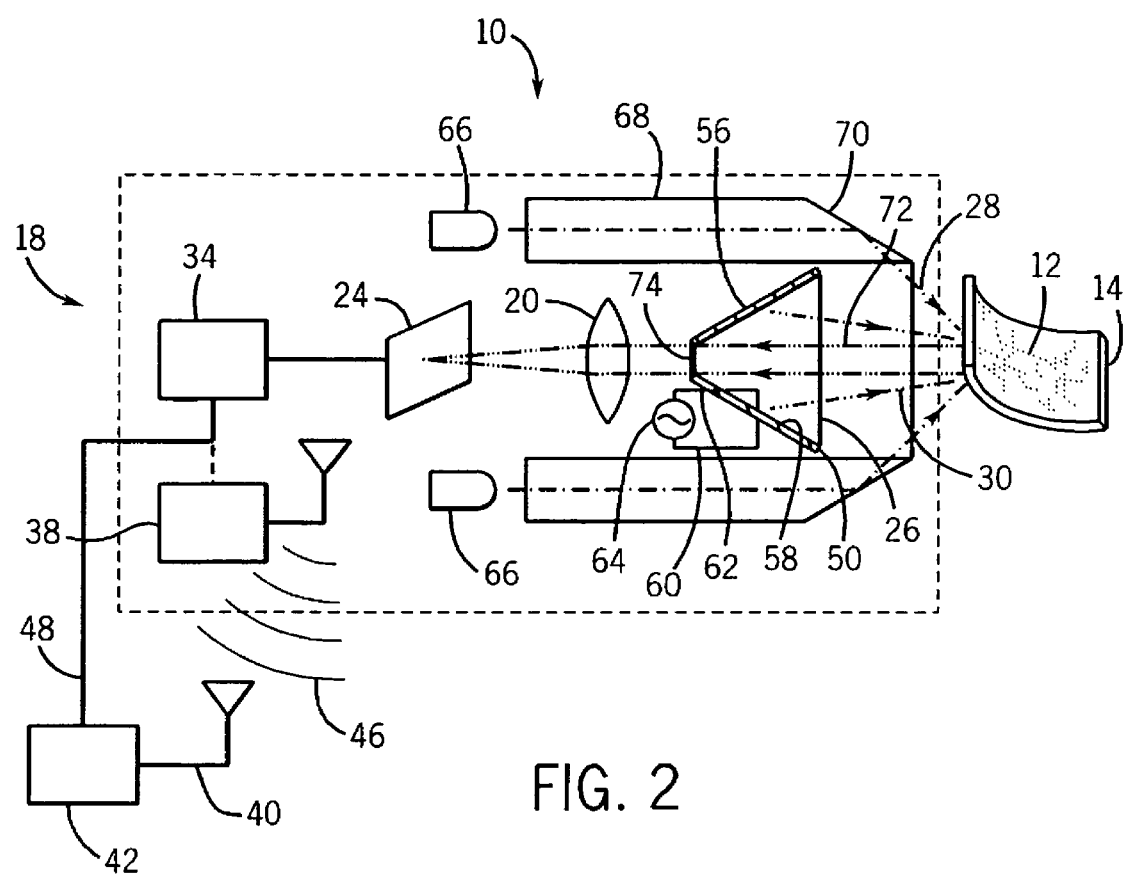
FIG. 2 is a schematic view of several of the components included in the apparatus of FIG. 1.

Referring now to the drawings, and more particularly to FIGS. 1 and 2, there is shown an apparatus 10 for imaging a symbol or characteristic 12 on an object 14 which generally includes a housing 16, an imaging or detection module 18 connected to housing 16, where imaging module 18 includes at least one lens 20 for creating an image of symbol 12, and a sensor 24 for sensing the image. Apparatus 10 further includes an electroluminescent light panel or sheet 26 connected to housing 16, where electroluminescent light sheet 26 provides dark field illumination 28 and/or bright field illumination 30. Electroluminescent light sheet 26, and other electroluminescent light sheets described below, can provide an extended diffuse (uniform, non-directed, cloudy day) type illumination which can advantageously be use to read dark marks, on highly polished surfaces such as laser or chemically etched, or inkjet codes on polished cylindrical rods, sheets of metal, or semiconductor wafers, among other uses and advantages. For example, sheet 26 can comprise a Lambertian light source where the radiance (Watts/$m^2$-sr) or luminance (brightness, lumens/$m^2$-sr) is independent of the viewing angle relative to the surface of the sheet, although the present invention is not limited to such characteristics.

Symbol or characteristic 12 can be a DPM mark or other ID code, or can be another characteristic of object 14. Object 14 can be any kind of device or apparatus, or packaging thereof, and can include curved and/or flat surfaces, or some combination thereof, on which symbol 12 is located.

Housing 16 can be in the form of a handheld device as shown, or fixed mount or other types of housings. Apparatus 10 can include a base 32 which can have a docking station for data download, and/or a charging station and/or a holder.

Module 18 can include a data processing module 34 which is connected to sensor 24. Data processing module 34 can be a microcomputer, microprocessor, field programmable gate array, application specific integrated circuit, or other electronic processing devices. Module 34 performs pattern recognition and other algorithms necessary for the interpretation of the image generated by sensor 24. These algorithms can be in the form of software, hardware, firmware or some combination thereof. Apparatus 10 can be a cordless and/or a corded version, where in the case of a cordless operation, a transmitter 38 communicates wirelessly to a receiver 40 of a central or network processing unit 42 via a wireless signal 46, and in the case of a corded operation, communicates with central processing unit 42 via cable 48. Although imaging element 20 is shown as an imaging lens, element 20 can include other elements such as fiber optics, an integrated optics light guide, Fourier transform lenses, mirror(s), other optical and lens components, and/or combinations thereof.

Electroluminescent light sheet 26 has a substrate 50 which includes an electroluminescent material. The electroluminescent material can typically be a phosphor powder (not necessarily the chemical phosphorous) such as copper dopped or activated zinc sulfide (ZnS:Cu) which may, or may not, be held in a binder material (often plastic) of a high dielectric constant. Other examples of phosphors include, but are not limited to, silicon carbide (SiC), zinc sulfide doped with manganese (ZnS:Mn), rare-earth doped ZnS, strontium sulfide doped with cerium (SrS:Ce), SrS:Cu, calcium sulfide (CaS), a combination of SrS:Ce and SrS doped with europium (SrS:Eu), SrS:Ce/ZnS:Mn, SrS:Cu/ZnS:Mn, and others. Different phosphors emit different wavelengths or colors, which can be a selection criteria.

Substrate 50 has a first side 52 and a second side 54 opposite first side 52 (see FIG. 1). A first electrode 56 is connected to first side 52, where first electrode 56 is opaque, and more particularly, is typically a reflective metal. First electrode 56 can typically cover a large portion, all, or nearly all, of first side 52, which helps provide a more uniform field over and across substrate 50, which in turn, helps substrate 50 provide a more uniform illumination over the surface of second side 54. At least one second electrode 58 is connected to second side 54, where each second electrode 58 is transparent and/or translucent. Glass coated with indium oxide, tin oxide, or indium tin oxide (ITO) for example, or other materials, can comprise the second electrode. As with first electrode 56, second electrode 58 can typically cover a large portion, all, or nearly all, of second side 54. Additionally, electroluminescent light sheet 26 can include a thin insulating layer (not shown) between side 52 and electrode 56 and/or between side 54 and electrode 58. Yttrium oxide ($Y_2O_3$) can be used for the sandwiching insulators, for example, although other insulators are possible. Electrodes 56, 58 are connected to respective leads 60, 62, which are in turn connected to a suitable source of electrical power/field 64.

Substrate 50 can be a non-planar substrate as shown in FIG. 1, with an inwardly facing side 54 and an outwardly facing side 52 opposite inwardly facing side 54. The non-planar substrate 50 can be frustoconical shaped, as shown, or other shapes.

In the specific embodiment shown in FIGS. 1 and 2, bright field illumination 30 is provided by electroluminescent light sheet 26, whereas dark field illumination 28 is provided by LEDs 66 through light pipe 68. Faceted surface 70 reflects dark field illumination 28, through a process of total internal reflection or other types of reflection, to illuminate object 14 with dark field illumination 28 at an appropriate low-angle. Reflected light 72 includes information relative to symbol 12 and object 14, and is reflected back through central aperture 74 of sheet 26 and lens 20 along optical axis 76, for subsequent processing by sensor 24, processor 24, and processor 42. In the handheld embodiment shown in FIGS. 1 and 2, symbology reader 10 can include a trigger 78 on handle 80 which can actuate ID reader 10 to illuminate object 14, and subsequently process reflected light 72.

Figure 3:
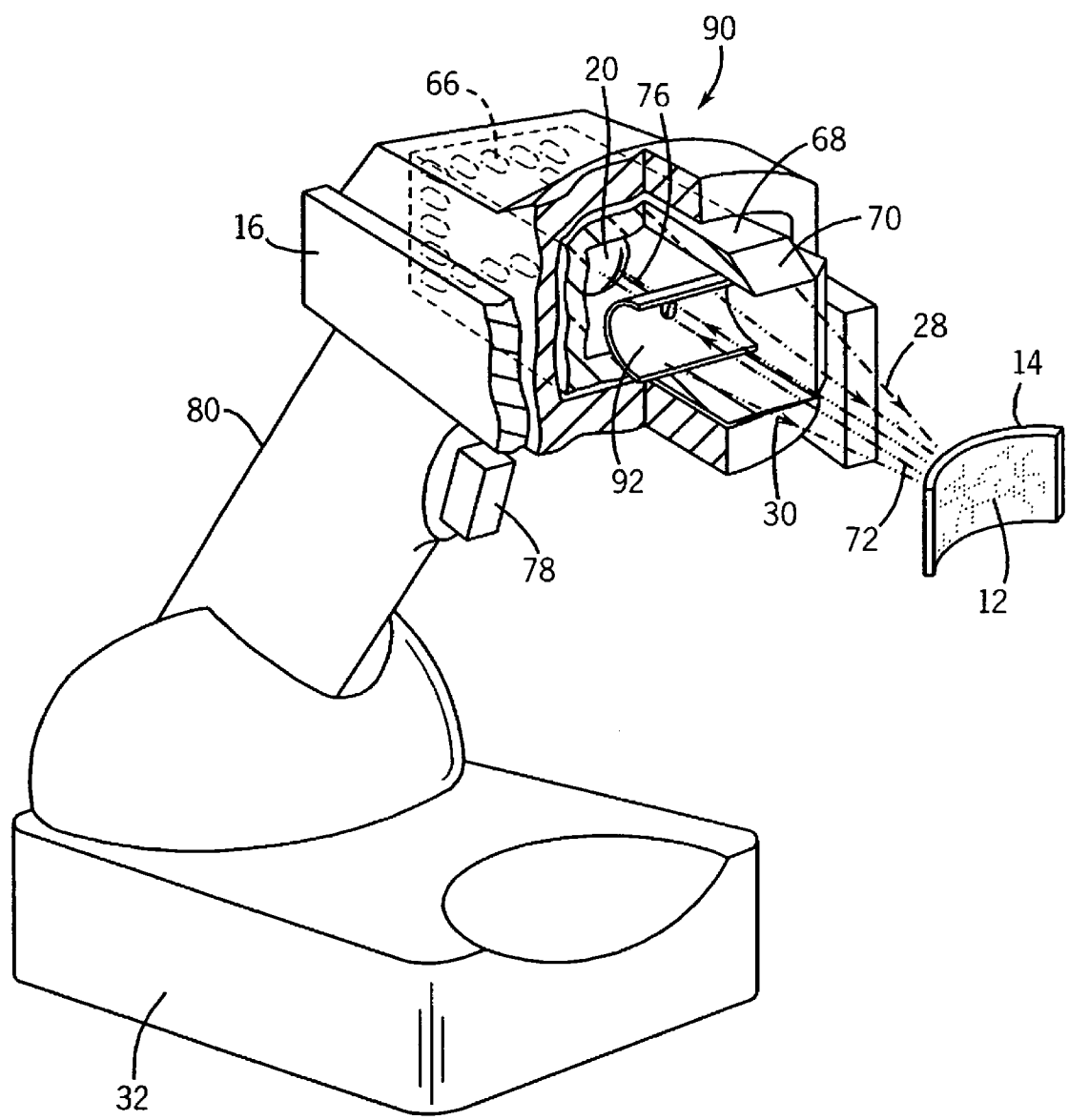
FIG. 3 is a fragmentary perspective view of another embodiment of an optical detection system, particularly in the form of a symbology or ID reader, and including an at least partially cylindrical electroluminescent light sheet.

Referring now to FIG. 3 and still to FIG. 1, apparatus 90, is similar to apparatus 10, except that light sheet 26 is replaced with electroluminescent light panel or sheet 92 which includes a non-planar substrate which is at least partially cylindrical as is shown. The substrate can include the electroluminescent materials as has already been described. Further, electroluminescent light sheet 92 includes electrodes similar to electrodes 56, 58, adapted to the at least partially cylindrical shape of the substrate, and leads attaching the electrodes to electrical source 64, and other elements as have been described for light sheet 26 such as a central aperture and sandwiched insulating layers if required.

Figure 4:
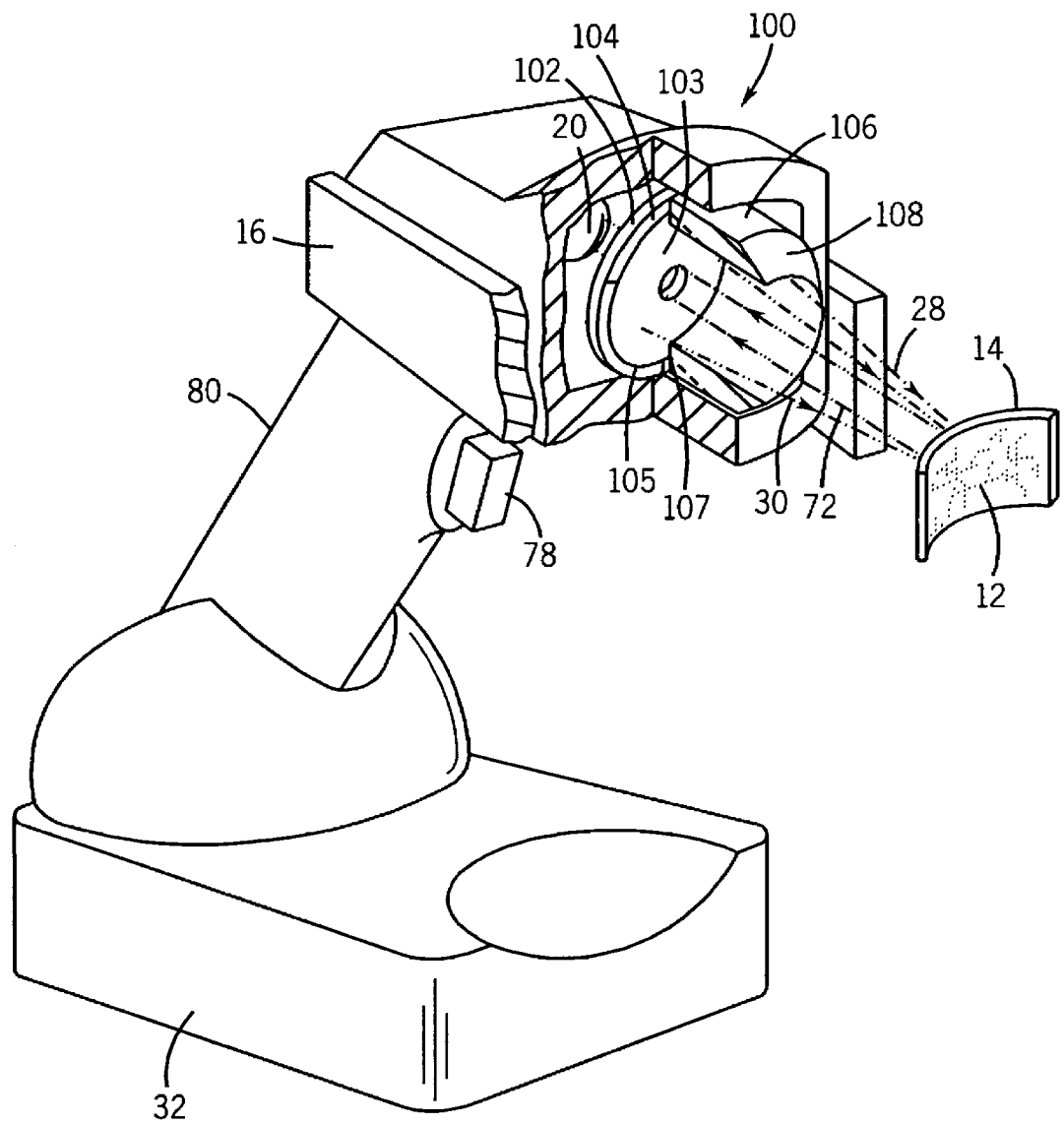
FIG. 4 is a fragmentary perspective view of another embodiment of an optical detection system, particularly in the form of a symbology or ID reader, and including an annular ring electroluminescent light sheet.

Referring to FIGS. 1 and 4, apparatus 100 is similar to imaging systems 10 and 90, except that light sheets 26 and 92 are replaced with electroluminescent light panel or sheet 102 which includes a substrate which is an annular ring as shown. The substrate can include the electroluminescent materials as have already been described. Further, electroluminescent light sheet 102 includes electrodes similar to electrodes 56, 58, adapted to the annular ring shape of the substrate. In this embodiment, the second electrode comprises a plurality of second electrodes, including a center electrode 103 and perimeter electrodes 104, 105, 107, etc., connected to the emitting second side, where each of the second electrodes is transparent and/or translucent, and where each of the second electrodes defines an exclusive segment of the substrate. Electrodes 103, 104, 105, 107, etc., can be separately electrified to energize their respective substrate segments, and the segments of the electroluminescent substrate can include different phosphors, as have been described, so that a particular segment may emit light of a particular color or combination of colors, i.e., selective color illumination. In this way, electroluminescent light sheet 102 can provide both bright field illumination 30 by energizing the central part of the substrate (electrode 103), and dark field illumination 28 through light pipe 68 by energizing the outer perimeter electrodes of the substrate (104, 105, 107, etc.), thereby eliminating the need for LEDs 66, and can also provide selective color illumination. Selective color illumination, and more particularly color illumination and color filtration, is described further in U.S. patent application Ser. No. 11/257,410, entitled "SYSTEMS AND METHOD FOR EMPLOYING COLOR ILLUMINATION AND COLOR FILTRATION IN A SYMBOLOGY READER", which is incorporated herein by reference.

Electroluminescent light sheet 102 necessarily includes a separate lead to each of second electrodes 103, 104, 105, 107, etc., so that they can be controlled separately, and imaging system 100 can include a switch (not shown) controlled by processor 34, for separately energizing second electrodes 103, 104, 105, 107, etc. Further, electroluminescent light sheet 102 can include other elements as have been described for light sheet 26 such as a central aperture and sandwiched insulating layers, if required. Imaging system 100 includes light pipe 106 with angled surface 108, which pipe 106 is cylindrical to conform to the perimeter electroluminescent segments associated with perimeter second electrodes 104, 105, 107.

Figure 5:
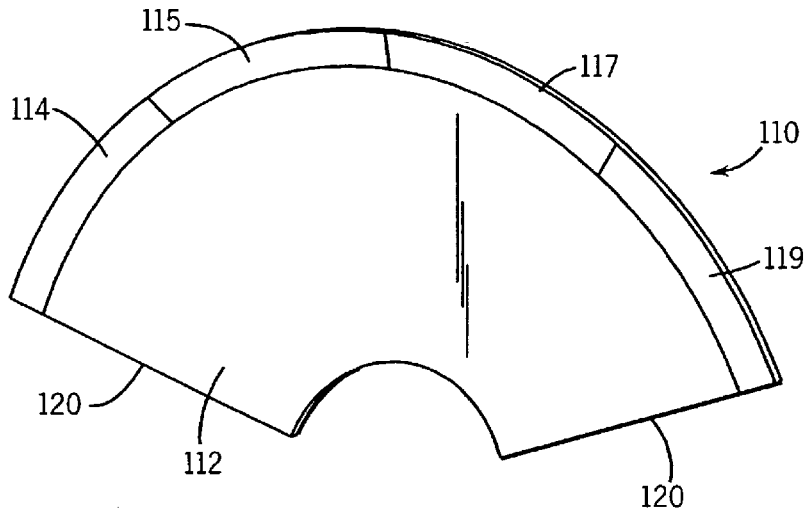
FIG. 5 is a perspective view of another embodiment of an electroluminescent light sheet shown in sheet form.
Figure 6:
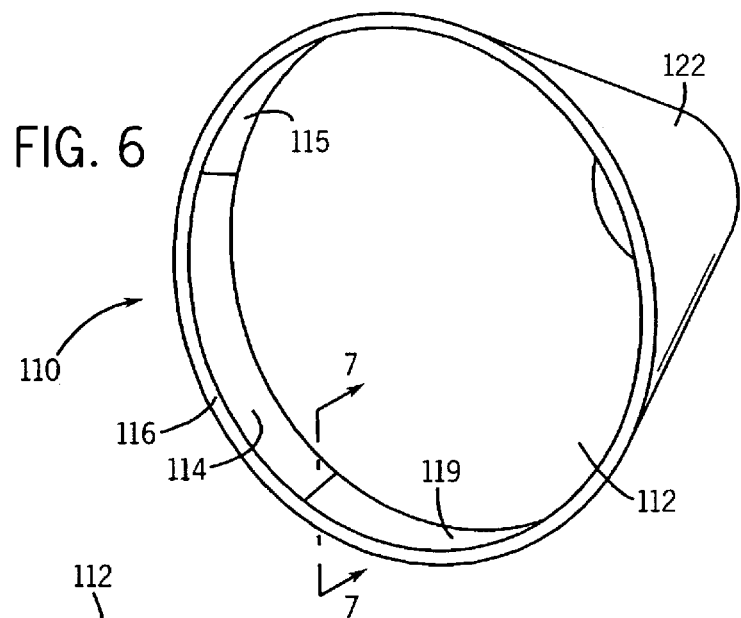
FIG. 6 is a perspective view of the electroluminescent light sheet of FIG. 5 after being formed into a frustoconical shape.
Figure 7:
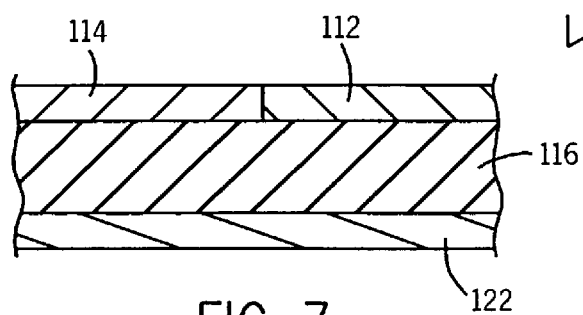
FIG. 7 is a cross-sectional view taken along section line 7-7 in FIG. 6.

FIGS. 5-7 illustrate an electroluminescent light panel or sheet 110, and possible method of manufacture thereof. Light sheet 110 includes a central second electrode 112, and perimeter second electrodes 114, 115, 117 and 119, each of which are associated with a respective exclusive segment (i.e., the electroluminescent material under the respective electrode) of substrate 116. As has been previously described, electroluminescent light sheet 110 can include a separate lead to each of second electrodes 112, 114, 115, 117 and 119 so that each second electrode can be controlled separately, and apparatus 118 (FIG. 8) can include a switch (not shown) controlled by processor 34, for separately energizing each second electrode. Further, electroluminescent light sheet 110 can include other elements as have been described for light sheet 26 and 102 such as a central aperture, sandwiched insulating layers if required and different electroluminescent materials for respective substrate elements, such as different phosphors emitting different wavelengths, or colors, of light. Electroluminescent light sheet 110 can be formed as a flat sheet as shown in FIG. 5 which can be rolled and joined at edges 120 to form the frustoconical shape shown in FIG. 6. Alternatively, electrodes 112, 114, 115, 117 and 119 can be formed on a frustoconical mold, for example, with substrate 116, first electrode 122, and any sandwiched insulating layers if required, being subsequently deposited thereon.

Figure 8:
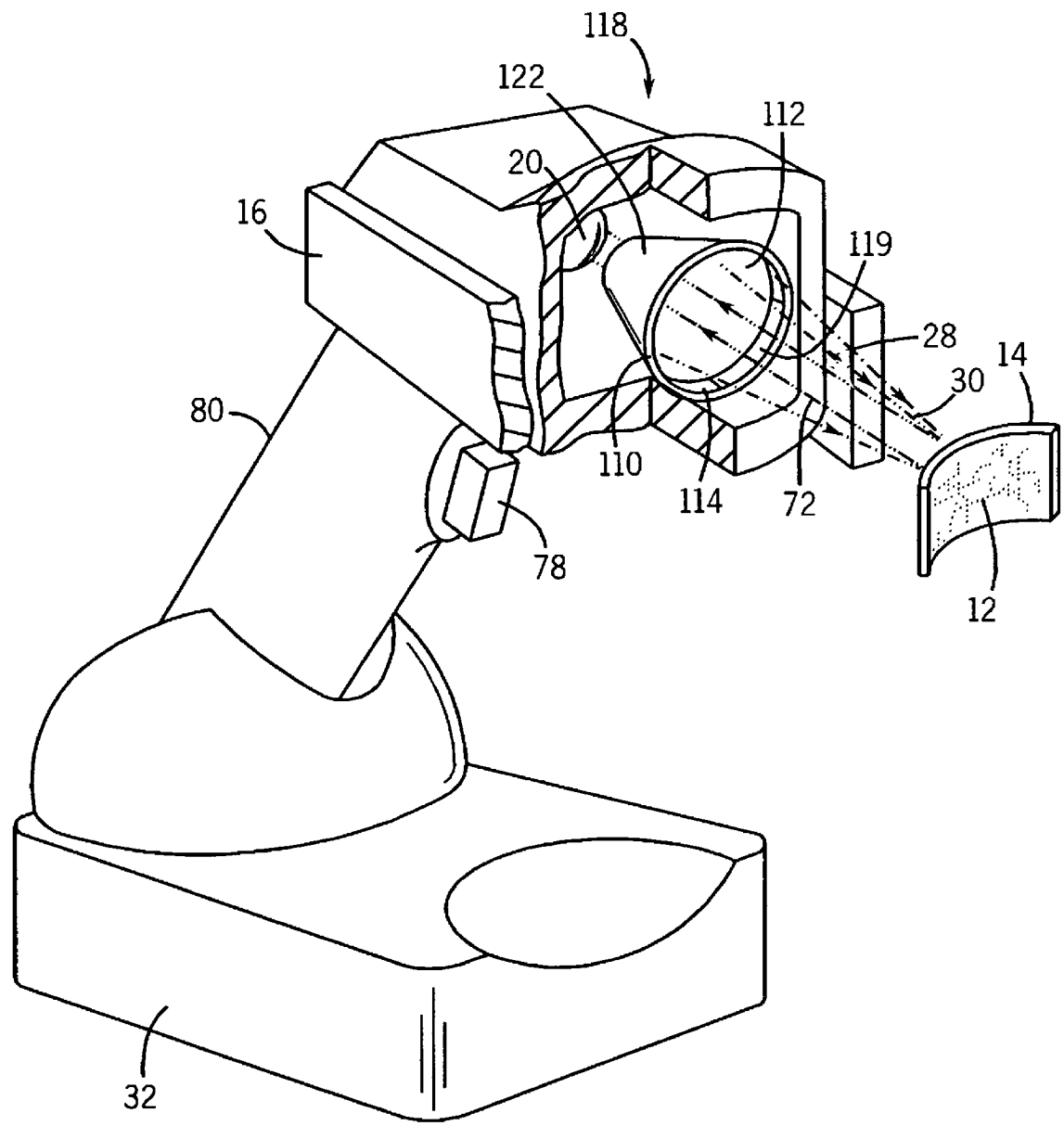
FIG. 8 is a fragmentary perspective view of another embodiment of an optical detection system, particularly in the form of a symbology or ID reader, and using the electroluminescent light sheet of FIG. 6.

Apparatus 118 of FIG. 8, is similar to imaging systems 10, 90 and 100, except that electroluminescent light panels or sheets 26, 92 and 102 are replaced with electroluminescent light sheet 110 which can provide both bright field illumination 30 by energizing electrode 112, and dark field illumination 28 by energizing one or more of the secondary electrodes 114, 115, 117 and/or 119, without the need for light pipe 68. Consequently, all illumination LEDs are eliminated, along with associated reflectors and light pipes, simplifying the design while at the same time providing more uniform bright field and dark field illumination. In addition, a reader 118 can provide selective color illumination.

The electroluminescent light sheets according to the present invention can include other shapes such as other frustums including frustopyramidal shapes; hyperbolic, parabolic elliptical, and other complex curvatures, and combinations thereof.

Figure 9:
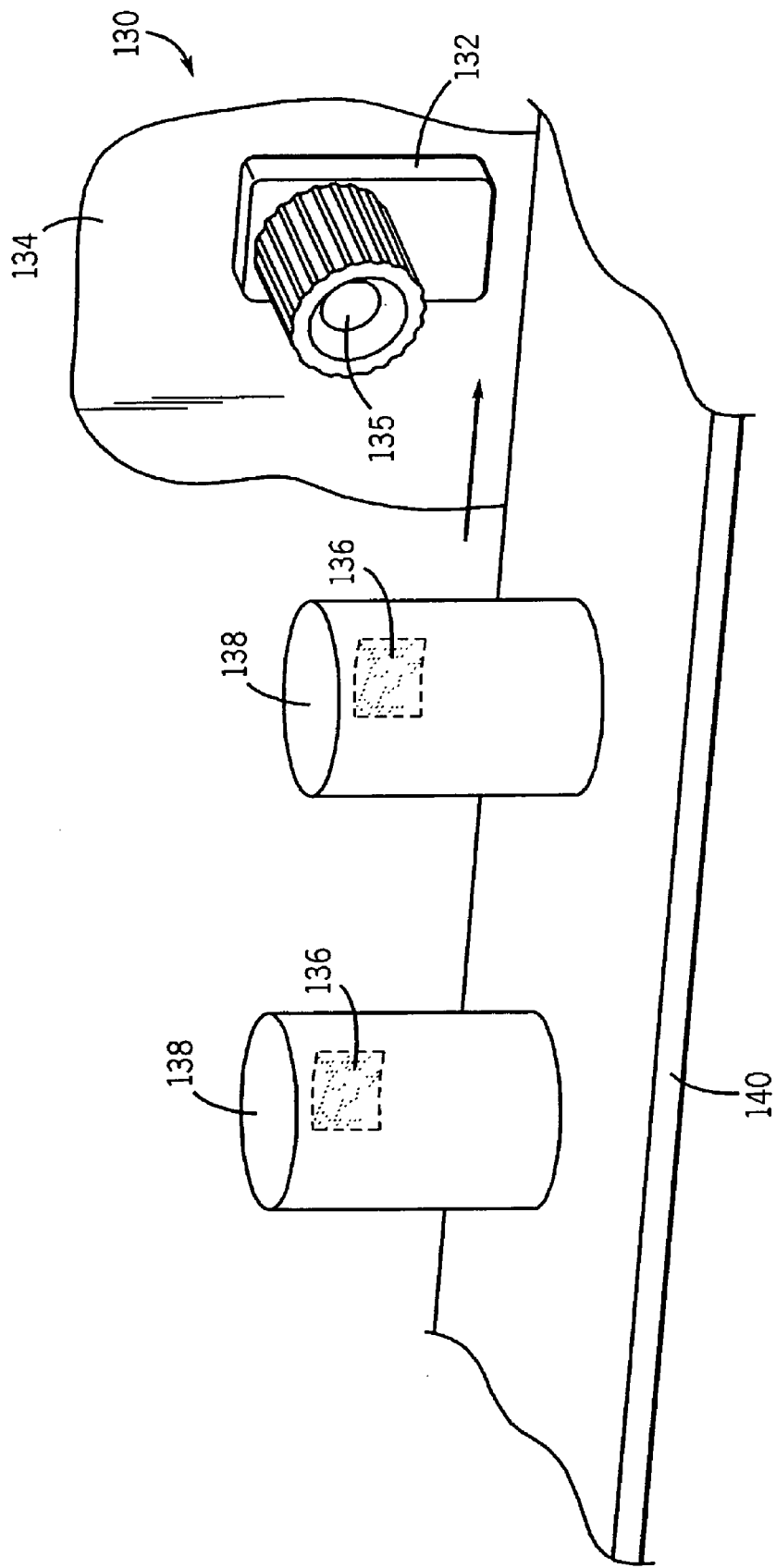
FIG. 9 is a perspective view of another embodiment of an optical detection system, particularly in the form of a fixed-mount symbology or ID reader.

In the embodiment of FIG. 9, optical detection apparatus 130, in the form of a fixed mount symbology reader, is similar to systems 10, 90, 100 and 118, and can include any of the elements associated therewith. Instead of including housing 16 adapted for handheld use, apparatus 130 includes housing 132, which is fixedly attached to stand 134, and which holds a presently inventive electroluminescent light panel or sheet 135, which can have any of the elements and features of the other electroluminescent light sheets previously described, to detect and interpret a symbol or characteristic 136 of an object 138. As with systems 10, 90, 100 and 118, apparatus 130 can be part of a machine vision system which is automated with elements such as conveyor 140.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. An apparatus for detecting and recognizing at least one characteristic of an object, comprising:
    a housing;
    a detection module supported by the housing, the detection module including an imaging element for directing a reflected light from the object wherein the reflected light includes information inherent in the at least one characteristic; and
    a single electroluminescent light sheet including exclusive segments that are independently controllable to generate light, the exclusive segments including dark field segments and bright field segments, the light sheet comprising an electroluminescent material and supported by the housing with the dark field segments relatively closer than the bright field segments to the object to be imaged; and
    a controller connected to each of the bright field and dark field segments, the controller programmed to selectively activate the segments to generate either of dark field illumination and bright field illumination.

2. The apparatus of claim 1 further including at least a first electrode and a plurality of second electrodes wherein each of the second electrodes defines one of the exclusive segments, wherein the first electrode is opaque, and at least one of the second electrodes is at least one of transparent and translucent.

3. The apparatus of claim 2, wherein each of the plurality of second electrodes are at least one of transparent and translucent.

4. A method of illuminating and detecting a symbol which is on an object, comprising the steps of:
    providing an apparatus for imaging the symbol which is on the object, the apparatus including a housing, an imaging module supported by the housing, the imaging module having at least one lens for creating an image of the symbol, and the imaging module further including a sensor for sensing the image, an electroluminescent light sheet comprising a substrate including an electroluminescent material supported by the housing, the electroluminescent light sheet configured in a plurality of exclusive separately-activatable segments including dark field and bright field segments; and
    selectively illuminating the symbol on the object with at least one of the dark field and the bright field segments.

5. The method of claim 4, further including the step of reflecting at least one of the dark field illumination and the bright field illumination from the symbol into the imaging module.

6. The method of claim 4, further including the step of imaging the symbol onto the sensor using the lens.

7. The method of claim 4 wherein the light sheet is formed about a space through which light from the symbol being imaged passes toward the imaging module and wherein the dark field segments are closer than the bright field segments to the symbol being imaged.

8. The method of claim 7 wherein the light sheet is bent into a frustum shape and the segments near the perimeter portion and near an interior portion of the frustum are dark and bright field segments, respectively.

9. An apparatus for detecting and recognizing at least one characteristic of an object, comprising:
    a housing;
    a detection module supported by the housing, the detection module including an imaging element for directing a reflected light from the object wherein the reflected light includes information inherent in the at least one characteristic; and
    an extended diffuse illumination source comprising a non-planar electroluminescent material sheet supported by the housing, the extended diffuse illumination source including a perimeter portion for selectively generating a dark field illumination and a central portion for selectively generating bright field illuminations.

10. The apparatus of claim 9 wherein the non-planar sheet forms a frustum.

11. An apparatus for imaging a symbol associated with an object, comprising:
    a housing;
    an imaging module connected to the housing, the imaging module including at least one lens for creating an image of the symbol, and a sensor for sensing the image;
    a single electroluminescent light sheet comprising an electroluminescent material supported by the housing and formed into a non-planar shape;
    at least first and second electrodes connected to the sheet, the second electrode including at least two second electrodes, each of the second electrodes defining one of a plurality of exclusive segments of the electroluminescent light sheet; and a controller connected to the sheet for controlling activation thereof.

12. The apparatus of claim 11, wherein at least one of the plurality of exclusive segments is on an outer perimeter of the substrate.

13. The apparatus of claim 11, wherein at least one of the exclusive segments comprises a first electroluminescent material that differs from a second electroluminescent material included in another of the exclusive segments.

14. The apparatus of claim 12, wherein the first electroluminescent material is selected to provide illumination in a color that is different from the color of the illumination provided by the second electroluminescent material.

15. The apparatus of claim 11 wherein the controller is linked to each of the second electrodes, the controller programmed to selectively activate the exclusive segments.

16. The apparatus of claim 15 wherein the exclusive segments include at least one center segment and perimeter segments and wherein the controller is programmed to selectively activate at least one of the perimeter segments to generate dark field illumination and to activate the at least one center segment to generate bright field illumination.

17. The apparatus of claim 11 wherein the non-planar light sheet has first and second ends where first and second exclusive segments are adjacent the first and second ends, respectively.

18. The apparatus of claim 17 wherein the second exclusive segments includes a plurality of second exclusive segments that are independently controllable by the controller.

19. An apparatus for detecting and recognizing at least one characteristic of an object, comprising:
a housing;
a detection module supported by the housing, the detection module including an imaging element for detecting a reflected light from the object wherein the reflected light includes information inherent in the at least one characteristic; and
a single electroluminescent light sheet including exclusive segments that are independently controllable to generate light, the light sheet supported by the housing; and
a controller connected to each of the exclusive segments, the controller programmed to selectively activate the segments to generate illumination.

20. The apparatus of claim 19 wherein the single electroluminescent light sheet is bent into a non-planar shape.

21. The apparatus of claim 20, wherein the non-planar shape is a frustoconical frustum.

22. The apparatus of claim 20, wherein the non-planar shape is at least partially cylindrical.

23. The apparatus of claim 20, wherein the non-planar shape comprises an annular ring.

24. The apparatus of claim 20, further including an imaging lens connected to the housing, the electroluminescent light sheet including a central aperture, the imaging lens and the central aperture defining an optical axis of the apparatus.

25. The apparatus of claim 19 wherein the single electroluminescent light sheet is supported by the housing about an optical axis of the apparatus with at least a portion of the light sheet disposed to a first side of the optical axis and at least a second portion of the light sheet disposed on a second side of the optical axis that is opposite the first side so that the single light sheet is capable of generating light on each of the first and second sides of the optical axis.

26. The apparatus of claim 25 wherein the single electroluminescent light sheet is formed into a non-planar shape.

27. The apparatus of claim 19 wherein the exclusive light segments include at least one exclusive dark field segment and at least one exclusive dark field segment.

28. The apparatus of claim 19 wherein the exclusive light segments include at least a first exclusive light segment that is relatively closer to the object to be imaged than is a second exclusive light segment.

29. The apparatus of claim 19, wherein at least one of the exclusive segments comprises a first electroluminescent material that differs from a second electroluminescent material included in another of the exclusive segments.

30. The apparatus of claim 29, wherein the first electroluminescent material is selected to provide illumination in a color that is different from the color of the illumination provided by the second electroluminescent material.

31. The apparatus of claim 19 wherein the exclusive segments include at least one center segment and perimeter segments and wherein the controller is programmed to selectively activate at least one of the perimeter segments to generate dark field illumination and to activate the at least one center segment to generate bright field illumination.

* * * * *